April 21, 1953     F. B. LIEBHABER     2,635,685
COMBINATION WINDOW SCREEN AND BLIND ATTACHMENT
Filed Oct. 22, 1951     4 Sheets-Sheet 1
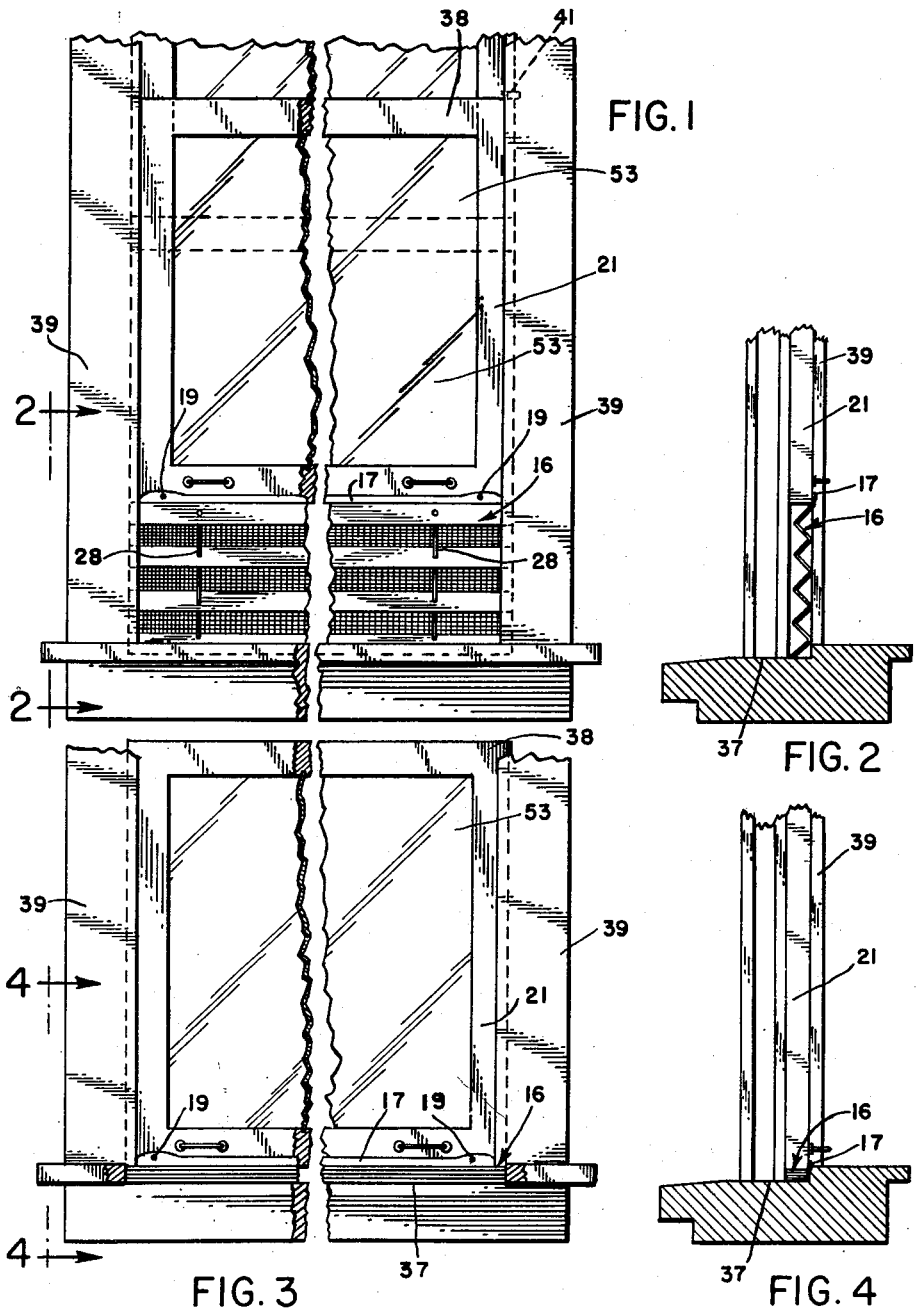
*INVENTOR.*
Frank B. Liebhaber
BY
*Attorney*

April 21, 1953 F. B. LIEBHABER 2,635,685
COMBINATION WINDOW SCREEN AND BLIND ATTACHMENT
Filed Oct. 22, 1951 4 Sheets-Sheet 2
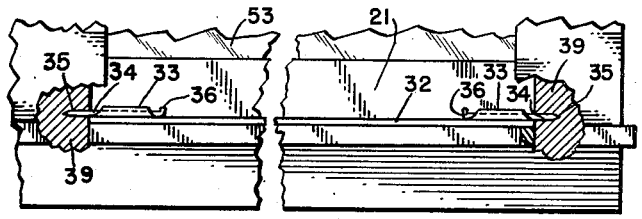
FIG. 6
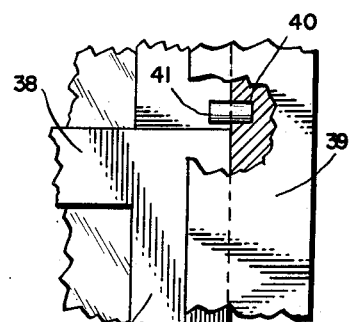
FIG. 11
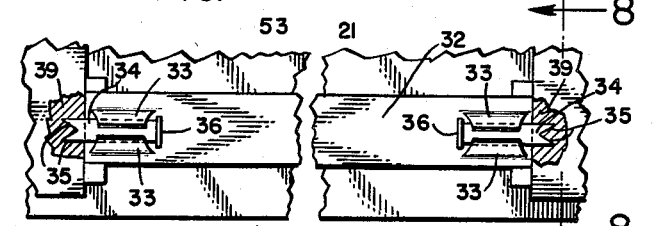
FIG. 7
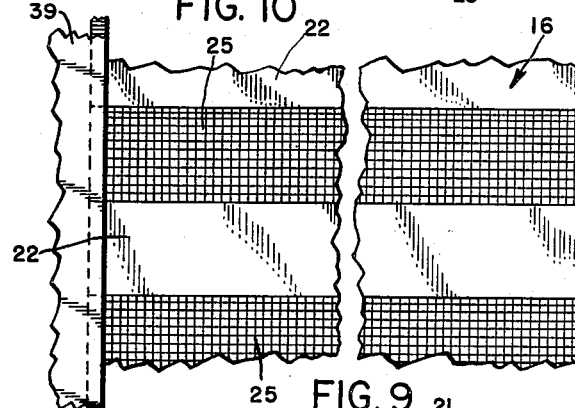
FIG. 10
FIG. 9
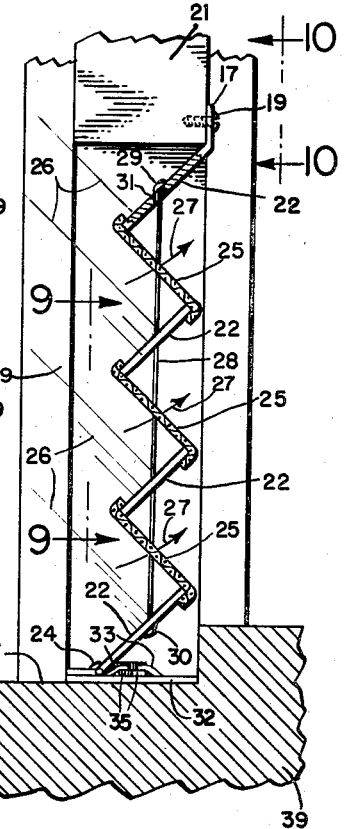
FIG. 5
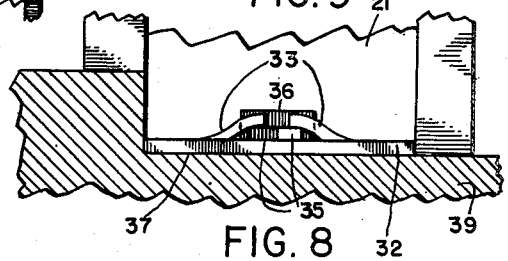
FIG. 8
INVENTOR.
Frank B. Liebhaber
BY
Attorney April 21, 1953  F. B. LIEBHABER  2,635,685
COMBINATION WINDOW SCREEN AND BLIND ATTACHMENT
Filed Oct. 22, 1951  4 Sheets-Sheet 3

INVENTOR.
Frank B. Liebhaber
BY
Attorney

April 21, 1953  F. B. LIEBHABER  2,635,685
COMBINATION WINDOW SCREEN AND BLIND ATTACHMENT
Filed Oct. 22, 1951  4 Sheets-Sheet 4

INVENTOR.
Frank B. Liebhaber
BY
Attorney

Patented Apr. 21, 1953

2,635,685

UNITED STATES PATENT OFFICE 2,635,685

COMBINATION WINDOW SCREEN AND BLIND ATTACHMENT

Frank B. Liebhaber, Chicago, Ill.

Application October 22, 1951, Serial No. 252,455

7 Claims. (Cl. 160—102)

My invention relates to combination accordion-type blind and screen attachments which may be removably secured to standard window structures.

An important object of my invention is to provide a device of the aforementioned character which may be readily attached to, or removed from, a sash frame and its mating window frame so that the blind elements thereof will prevent the sun's rays from entering the interior of a building, whereas the screen section thereof will permit some light and air to enter the building therethrough simultaneously preventing insects from entering the building.

A still further object of my invention is to provide in a device of the aforementioned character means for attaching the same between the confines of the bottom of a sash frame and the window ledge on the window frame.

A still further object of my invention is to provide a device of the aforementioned character which will be operative collapsibly and extensibly within the confines of an opening controlled by opening of the window to a certain definite distance.

A still further object of my invention is to provide stop means for limiting the extensibility of the said combination blind and screen structure comprising my invention.

A still further object of my invention is to provide means for instantaneously securing the lower end of the said combination blind and screen structure.

A still further object of my invention is to provide cable means in a device of the aforementioned character which will maintain the same in accordion-like arrangement.

A still further object of my invention is to provide a combination blind and screen structure which may be collapsed simultaneously with the closing of the sash frame to which it may be attached, the same occupying an insignificant space or area.

A still further object of my invention is to provide an accordion-type blind structure which will extend and collapse with the opening and closing of a window.

A still further object of my invention is to provide an accordion-type blind and screen structure which will extend or collapse respectively with the opening and closing of a sash frame.

It is a further object of my invention to provide seal means secured to one of the window frames so as to provide a closure between the upper and lower sash frames when the lower sash frame is in open position.

A still further object of my invention is to provide seal means to act as a closure for the open space between two sash frames when the said sash frames are in open relationship.

A still further object of my invention is to provide seal means including channel means having secured thereto felt seal means provided with notched portions at the termini thereof so as to seal the space defined by the parting rail and the sash frames when set in open relationship.

A still further object of my invention is to provide seal means of flexible or resilient material which will form an enclosure by intimate contact with the window panes of one of the sash frames being secured to the bottom edge of the other sash frame.

A still further object of my invention is to provide a practical device of the aforementioned character which will lend itself to economical manufacture in quantity production.

Other objects and advantages inherent in my invention will become apparent from examination of the following drawings, bearing further elucidation in the ensuing description, wherein like symbols are utilized to designate like parts, and in which:

Fig. 1 is a broken elevational view of a sash frame and window frame structure showing my invention secured thereto in open or operative position.

Fig. 2 is a fragmentary end view of Fig. 1, being an end view of the invention in the window and looking in the direction of arrows 2—2 on Fig. 1.

Fig. 3 is a view similar to Fig. 1 showing the device comprising my invention in closed or inoperative position.

Fig. 4 is a fragmentary end view looking in the direction of arrows 4—4 of Fig. 3.

Fig. 5 is a view similar to Fig. 2 greatly enlarged in order to depict the novel features comprising my invention.

Fig. 6 is an enlarged broken fragmentary view of the lower attaching means, an important element of my invention.

Fig. 7 is a top view of the fragmentary view indicated in Fig. 6 with the window sash removed.

Fig. 8 is an end view looking in the direction of arrows 8—8 on Fig. 7.

Fig. 9 is an enlarged broken view looking in the direction of arrows 9—9 on Fig. 5.

Fig. 10 is an enlarged broken view looking in the direction of arrows 10—10 on Fig. 5.

Fig. 11 is an enlarged view of the stop means utilized for limiting the extensibility of my invention.

Figure 14:
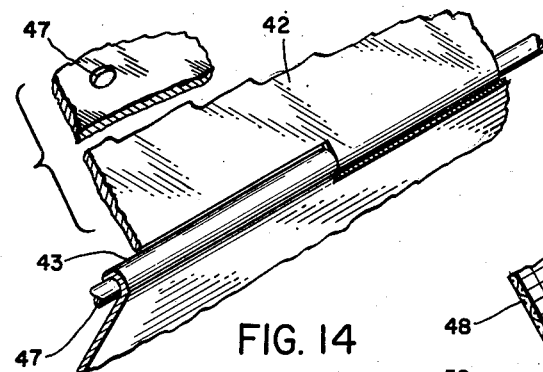
Fig. 14 is a fragmentary perspective view of the hinge means utilized in the modification illustrated in Fig. 12.

Referring to Figs. 1 to 11, the combination accordion-type blind and screen structure is illustrated, and is generally designated 16. In Figs. 1 and 2 the same is shown in open or operative position, whereas in Figs. 3 and 4, it is shown in closed, or collapsed, or inoperative positions. Figs. 5 to 11 illustrate enlarged fragmentary sections of the details comprising my invention.

Figs. 6 and 7 show the means for attaching readily and instantaneously the lower portion of my device which consists of a slat element 32 made of a very thin material, and from which are formed, by blanking and forming operations, the slide ears or guide ears 33 in which the locking means 34 slidably operates. The locking means 34 has a head portion 36 thereon and at its other terminal two tines 35 which are driven into the window frame 39 in which the window sash or sash frame operates. The fastening means or slat 32 is thus secured by driving the head 36 at the right and at the left into the window frame 39, thus securing the bottom section of my device.

At the top the securing section, designated 17, is attached by virtue of the enlarged holes 18 merging with the reduced slotted portions 20 so that they may engage the body of the screw 19, the head of the screw retaining the element 17 in place. The operation is simple inasmuch as the element 17 has the holes 18 thereof superimposed over the head 19, and then it is slid downwardly so that the slots 20 will engage the bodies of the screws 19. Thus the device is fastened in place.

Intermediately the upper section 17 and the lower section 32 are a number of alternate slat sections 22 and alternate screen sections 25 articulately secured so as to permit of extensibility and collapsibility to accordion-like formation. The same being held in their assigned positions illustrated in Fig. 5 by virtue of the cable means 28 which is secured at points 29 and 30, the holes 31 furnishing clearance for the sliding operation of the cable at the same time aiding in the definition of the accordion-like formation assumed by the combination accordion-type blind and screen structure, when in open position as illustrated in Fig. 5.

The slat 32 at the bottom is, preferably, secured at the bottom ledge 37 of the window frame 39. The bottom slat 32, Fig. 5, is provided with a projection 24 to limit the angular relationship between the slat and the screen elements.

To control and limit the upward movement of the sash frame 21, the top edge 38 is caused to abut a stop pin 41 which is lodged at 40 firmly in the window frame 39. Thus it can be seen that when the lower said frame 21 is opened, so that the top edge 38 abuts the stop pin 41, the accordion-like definition will be imparted to the combination accordion-type blind and screen structure and will allow the rays of light 26 only partially to enter as indicated at 27; through the screen structure, air will also enter the building whereas the slatted structure 22 will deflect certain rays of light 26 and thus reduce the illumination and the sun's rays within the room when it is desired to limit the same. When not in use and the window is closed as indicated in Figs. 3 and 4, the entire device collapses to occupy a minimum of space, and is thus set in inoperative position no longer functioning as intended when open, in which event the window pane 53 admits light into the room as desired.

Figure 12:
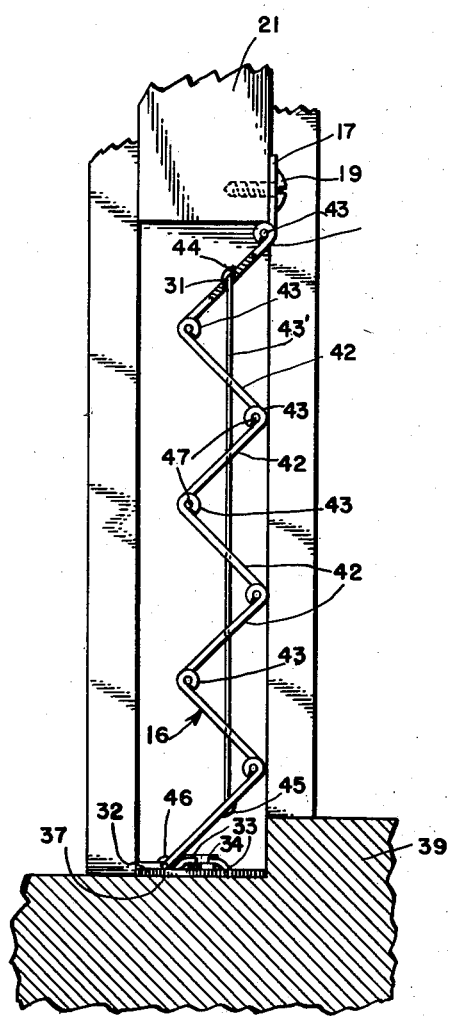
Fig. 12 is an enlarged end view similar to Fig. 5 showing a slightly modified form of my invention indicating an accordion-like extensible and collapsible blind structure.

In Fig. 12 the construction is identical with that indicated in the former views with the exception that all the elements are slat elements as indicated at 42, hinged at 43, and controlled to assume the position indicated by the cable means 43' secured at the points 44 and 45, providing also an abutting portion 46 to limit the accordion-like formation of the slats 42. The holes 47 and intermediate slats 42 aid in maintaining the accordion-like configuration.

Figure 15:
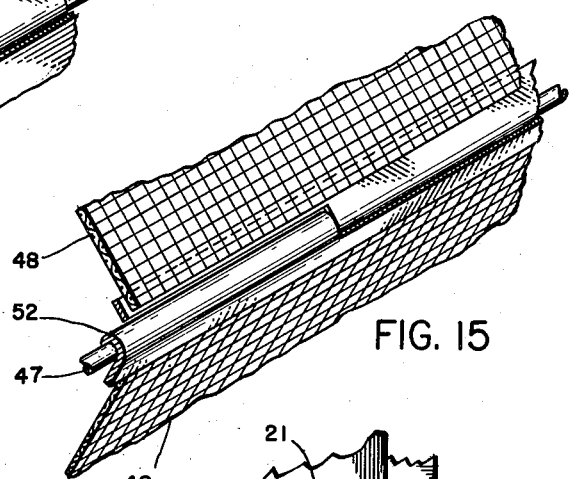
Fig. 15 is a fragmentary illustration indicating the hinge structure applied and used in the modification illustrated in Fig. 13.
Figure 13:
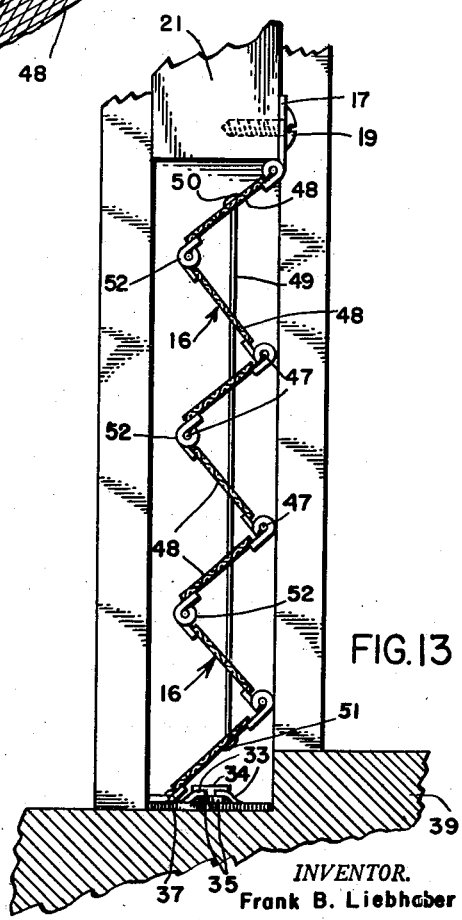
Fig. 13 is a view similar to Fig. 12 indicating a slightly modified form of my invention depicting an accordion-like screen structure adapted for extensibility and collapsibility thereof by virtue of the opening and closing of a window frame.

In Figs. 13 and 15, a similar structure is indicated with the exception that all the elements are screen elements designated 48 and are provided with hinge sections 52, a cable 49 secured at 50 and 51 in order to control the screen elements 48 to assume the formation indicated, the cable passing through openings in the screen to further define the shape indicated and illustrated in Fig. 13. The structures illustrated in Figs. 12 and 13 are collapsed to inoperative position or extended to operative positions as illustrated when the window sash 21 is either open or closed.

Figure 16:
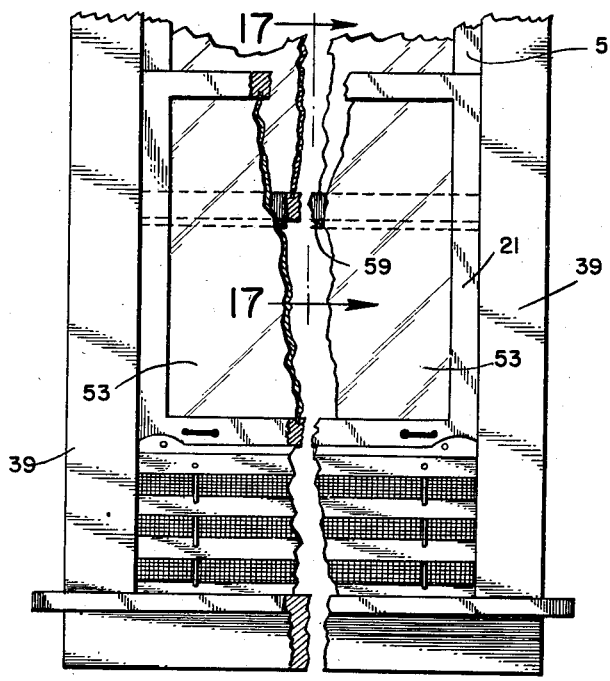
Fig. 16 is a front broken view of a window structure showing my invention secured thereto and showing the modification wherein seal means is also attached in order to form a complete enclosure to prevent foreign elements and insects from entering through the space defined between the sash frames when in open position.
Figure 17:
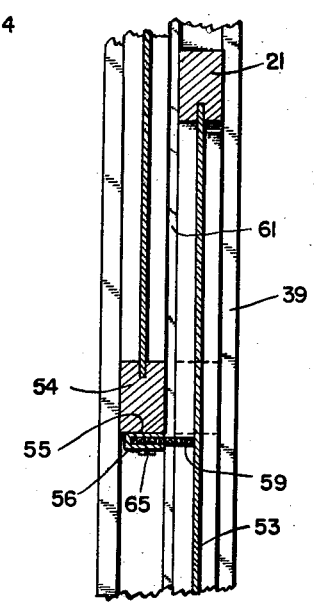
Fig. 17 is a cross-sectional view taken substantially on the line 17—17 of Fig. 16.

In the illustrations indicated in Figs. 16 to 20, it will be noted that the conventional window structure, including the window frame 39, in which the upper sash frame 54 and the lower sash frame 21 are slidably confined, utilizes a parting guide rail 61. Thus, when the windows are in open relationships as indicated in Figs. 16 and 17, an opening is defined therebetween which would be subject to invasion by insects and foreign matter coming into the interior of the building.

Figure 20:
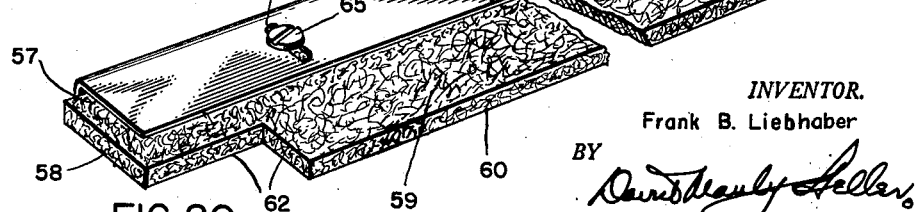
Fig. 20 is a perspective view of the channel seal means comprising an important element of, and adjunct to, the modifications disclosed in Figs. 1 to 15.

Therefore the improvement indicated in Fig. 20, namely the channel seal means, has been provided to close completely the opening defined by the open sash frames, and it consists of a channel structure or element 56 having a recess 57 therein in which is confined in crimped relationship a resilient or flexible seal means 58 made of rubber or felt, having a front sealing lip 59, the forward edge 60 thereof being of the same magnitude as the width of the lower window pane 53 and bears thereagainst in frictional and intimate contact therewith.

The lower edge 55 of the upper sash frame 54 furnishes means for securing the channel element 56 thereto, it being provided with elongated slotted portions 64 for adjustability in order to form a complete closure for the opening defined between the parting rail 61 and the open sash frames 54 and 21.

Figure 18:
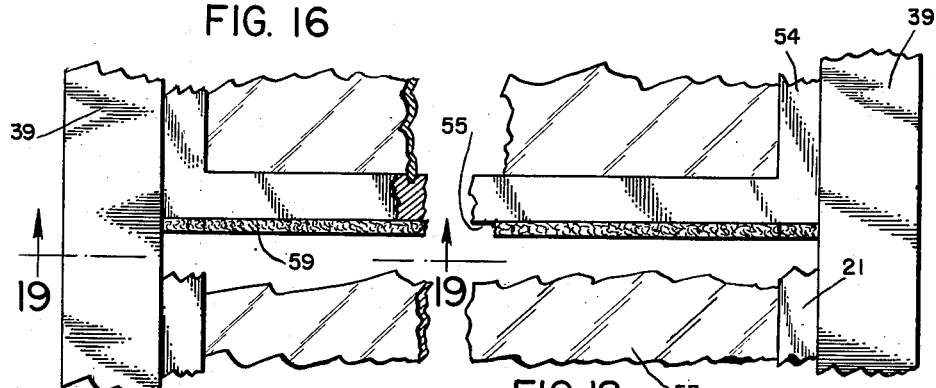
Fig. 18 is a fragmentary view of the lower edge of the upper sash frame showing the seal means secured in place thereon.
Figure 19:
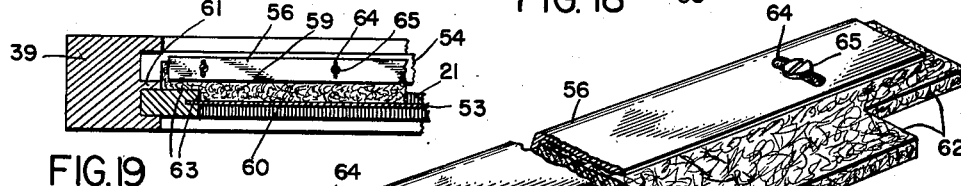
Fig. 19 is a cross-sectional view taken substantially on the line 19—19 of Fig. 18.

As will be noted in Figs. 18 and 19, the flexible element, or resilient element 59, is provided with cut out portions 62 to envelop the parting rail 61, or to seal the edge of the parting rail 61 and the inner edges 63 of the lower sash frame 21, as indicated in that view.

Thus when the invention, namely the combined blind and screen, is set in operative position, as indicated in Figs. 16 and 17, the seal means 56 will function to safeguard completely the home or the room of the building from invasion by flies, insects, and foreign elements. It will be noted that the seal means 56 does not hamper the closing of the window or the conventional locking means used at the top of the window frame 21, mating with the locking means secured to the bottom edge of the upper sash frame 54. The screws 65 furnish means of attachment to the lower edge 55 of the upper sash frame 54.

While the invention may be utilized without the seal means, it will make a more efficient unit when used in conjunction with the seal means forming a complete assemblage which will seal the room against insects, flies, foreign matter, and at the same time permit light and air, or light or air to enter the room.

While I have illustrated and described what I now regard as the preferred form of construction, it is to be understood that I expressly reserve the right to make all such changes or modifications as may fairly fall within the scope of the appended claims.

Having thus disclosed and revealed my invention, what I claim as new and desire to secure by Letters Patent is:

1. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, the said accordion-like blind and screen means including alternate blind and screen elements, the said blind elements being provided with aligned bores, and cable means reeved through the said bores and of a length less than the sum total of the widths of the said blind and screen elements in order to limit the extensibility of the said accordion-like blind and screen means.

2. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, stop means secured to a side of the said window frame and adapted to abut the upper edge of the said sash frame to maintain the said combination accordion-like blind and screen means in operative arrangement, the said accordion-like blind and screen means including alternate blind and screen elements, the said blind elements being provided with aligned bores, and cable means reeved through the said bores and of a length less than the sum total of the widths of the said blind and screen elements in order to limit the extensibility of the said accordion-like blind and screen means.

3. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, the said accordion-like blind and screen means including alternate blind and screen elements, the said blind portions being provided with aligned bores, cable means reeved through the said bores and of a length less than the sum total of the widths of the said blind and screen elements in order to limit the extensibility of the said accordion-like blind and screen means, guide ears adjacent the ends of the said lower slat means, and locking means slidably mounted in the said guide ears and provided with driving head means at one terminus thereof, and further provided with tine means at the other terminus thereof adapted to engage the sides of the said window frame.

4. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, stop means secured to a side of the said window frame and adapted to abut the upper edge of the said sash frame to maintain the said combination accordion-like blind and screen means in operative arrangement, the said accordion-like blind and screen means including alternate blind and screen elements, the said blind portions being provided with aligned bores, cable means reeved through the said bores and of a length less than the sum total of the widths of the said blind and screen elements in order to limit the extensibility of the said accordion-like blind and screen means, guide ears adjacent the ends of the said lower slat means, and locking means slidably mounted in the said guide ears and provided with driving head means at one terminus thereof, and further provided with tine means at the other terminus thereof adapted to engage the sides of the said window frame.

5. Combination accordion-like blind and screen means, comprising an upper securing section removably securable to the bottom edge of a slidably operable sash frame, lower slat means securable to a sill of a window frame in which the said sash is mounted, accordion-like blind and screen means secured intermediately and articulately to the said upper securing section and to the said lower slat means in extensible and collapsible formations, stop means secured to a side of the said window frame and adapted to abut the upper edge of the said sash frame to maintain the said combination blind and screen means in operative arrangement, and projection means on the bottom slat means of the said accordion-like blind and screen means adapted to abut the said lower slat means to limit the tilt of said bottom slat of the said accordion-like blind and screen means.

6. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, the said accordion-like blind and screen means including alternate blind and screen elements, the said blind elements being provided with aligned bores, cable means reeved through the said bores and of a length less than the sum total of the widths of the said blind and screen elements in order to limit the extensibility of the said accordion-like blind and screen means, and projection means on the bottom slat means of the said accordion-like blind and screen means adapted to abut the said lower slat means to limit the tilt of said bottom slat of the said accordion-like blind and screen means.

7. Combination accordion-like blind and screen means, comprising an upper securing section removably securable to the bottom edge of a slidably operable sash frame, lower slat means securable to a sill of a window frame in which the said sash frame is mounted, accordion-like blind and screen means secured intermediately and articulately to the said upper securing section and to the said lower slat means in extensible and collapsible formations, stop means secured to a side of the said window frame and adapted to abut the upper edge of the said sash frame to maintain the said combination blind and screen means in operative arrangement, the said accordion-like blind and screen means including alternate blind and screen elements, the said blind elements being provided with aligned bores, cable means reeved through the said bores and of a magnitude sufficient to limit the extensibility of the said accordion-like blind and screen means, and projection means on the bottom slat means of the said accordion-like blind and screen means adapted to abut the said lower slat means to limit the tilt of said bottom slat of the said accordion-like blind and screen means.

FRANK B. LIEBHABER.

References Cited in the file of this patent

UNITED STATES PATENTS

| Number | Name | Date |
|---|---|---|
| 41,911 | Emery | Mar. 15, 1864 |
| 83,053 | Engel | Oct. 13, 1868 |
| 1,007,499 | Sprinchorm | Oct. 31, 1911 |
| 1,307,479 | Bolte | June 24, 1919 |
| 1,479,948 | Wolf | Jan. 8, 1924 |
| 1,956,116 | Carver | Apr. 24, 1934 |
| 2,013,024 | Bollinger | Sept. 3, 1935 |
| 2,470,433 | Davis | May 17, 1949 |